Patented June 24, 1941

2,246,682

UNITED STATES PATENT OFFICE 2,246,682

CATALYST

Llewellyn Heard, Hammond, Ind., and Alex G. Oblad, Chicago, Ill., assignors to Standard Oil Company, Chicago, Ill., a corporation of Indiana No Drawing. Application November 16, 1938, Serial No. 240,642

2 Claims. (Cl. 252—230)

This invention relates to catalysts and more particularly to catalysts having a metal chromite as a support.

In the catalytic conversion of hydrocarbons, which includes such processes as cracking, polymerization, hydrogenation, dehydrogenation, alkylation, etc., a great variety of compounds have been used. In many, and in fact in most, instances it has been found desirable to support the most active catalytic material on a substance which is much less active, or even inert. The reason for this may be based on the physical characteristics of the active catalytic material which is often of such nature that it does not lend itself to the formation of the proper catalyst form; it may be desirable to "dilute" the catalytic material in order to reduce its activity; or it may be desirable to supply additional surface for better contact between the material undergoing conversion and the catalyst. The usual supports for such catalysts are such materials as pumice, clays, kieselguhr, fire brick, etc., which are comparatively inert, or gels such as silica gel or chromium oxide gel, which may modify the catalytic activity of the primary catalyst. Each of these materials has certain advantages and disadvantages; for example, the inert materials will supply additional contact surface and aid in the formation of catalysts of suitable size, shape and physical stability but will not influence to any great extent the catalytic activity of the primary catalyst. The gels, on the other hand, while in many cases offering suitable modifications of the catalytic reaction, are quite subject to disintegration and inactivation at the high temperatures necessary for the catalytic conversion process.

It is an object of our invention to provide new and improved catalysts which are of a refractory nature and characterized by large surface area. Another object of our invention is to provide a support for catalytic agents which also modifies beneficially the catalytic effect of the catalytic agent. It is a further object of our invention to provide an improved and a highly efficient catalyst for the dehydrogenation of hydrocarbon materials. Further objects will become apparent from a reading of the following more detailed description of our invention.

We have found that the metal chromites which are prepared by the thermal decomposition of crystalline hydrated metal ammonium chromates are particularly suitable as catalyst supports. Of these metal chromites we prefer to use magnesium chromite since we have found that it possesses considerable dehydrogenating activity in itself, and possesses all the characteristics necessary for a suitable catalyst support.

These metal chromites may be prepared as follows: An aqueous solution of a suitable salt, such as for example magnesium chloride or magnesium nitrate, is mixed with ammonium chromate or dichromate, preferably in approximately stoichiometric proportions, although an excess of the chromium compound may be used, and the solution allowed to stand until well-defined crystals of the hydrated metal ammonium chromate form. The crystals are then filtered off, washed and dried, and heated until they give off water and ammonia and are substantially completely decomposed. The temperature used is not critical but in general should be in the neighborhood of red heat. This method of preparation is described in the copending application of one of us, Llewellyn Heard, Serial No. 180,302, filed December 17, 1937 now U. S. Patent No. 2,205,140.

A microscopic examination of magnesium chromite prepared in this manner reveals it to be of highly porous nature and it has been found to withstand temperatures up to 1000° F. and higher without undergoing any transition of the crystal state. Moreover, the crystals are usually of a size and shape suitable for use in the catalytic conversion of hydrocarbons. However, if desirable, they may be crushed and screened to predetermined size or may be pelleted or otherwise shaped, either before or after the deposition of the active catalytic material. Metal chromites prepared in any other manner, for instance by the thermal decomposition of ammonio metal ammonium chromate or ammonio metal chromates, are equally suitable providing they possess the refractivity and porosity exhibited by the metal chromites prepared in accordance with the above description.

In the event that the crystalline metal chromites are too finely divided, when originally formed, to be suitable as a catalyst support, they can be ground to a powder in a ball-mill or similar pulverizing means, the powder formed into a paste with water, and the paste dried, preferably in a thin sheet. The dried product can now be crushed and screened to the proper size, and will possess the refractivity and porosity necessary for a suitable catalyst support. Metal chromites which can be treated in this manner include the chromites of copper, aluminum, zinc, cobalt, manganese, uranium, sodium, calcium, barium and strontium. When preparing catalyst supports in this manner, it is possible to use a solution of the active catalytic material as the medium for forming the paste, in which case further impregnation of the support is unnecessary.

The active catalytic material may be deposited upon the metal chromite in a number of different ways; for example, the chromite may be immersed in a solution of the active catalyst material and because of the porous, capillary nature of the chromite, the salt solution is adsorbed. The excess can then be poured off and the catalyst dried.

If it is desirable to incorporate metals or metal oxides on the catalyst support this may be accomplished by impregnating the catalyst with an aqueous solution of a metal salt subject to ready thermal decomposition to the oxide of the metal or to the metal itself. After the salt-impregnated chromite is dried it is subjected to suitable heat in the presence of hydrogen or a hydrocarbon, if desired, with the reduction of the salt to a suitable oxide or metal completely and finely deposited throughout the support.

It is also possible to prepare active catalysts by the deposition of carbonyls on the magnesium chromite with the subsequent decomposition of the carbonyl to leave the metal deposited on the support. Volatile metal carbonyls may be incorporated under pressure while the nonvolatile carbonyls may be adsorbed in the liquid phase. Double metal carbonyls are equally applicable.

All of these methods of incorporating active catalytic materials on a support have been known for some time and other methods of applying suitable catalysts will occur readily to one skilled in the art.

We have found that catalysts in which a metal chromite is used as a support are particularly efficacious in the dehydrogenation of hydrocarbons. Because of their highly refractory and highly porous nature they are equally applicable to other catalytic processes where a large surface area is of advantage and where the temperatures employed require the use of a heat-resistant material.

Our invention will be better understood from the following specific examples which demonstrate the effectiveness of our catalyst in the dehydrogenation of hydrocarbons.

*Example I.*—A catalyst was prepared as follows: Magnesium chromite prepared by the decomposition of magnesium ammonium chromate hexahydrate was immersed in a 3% solution of platinum chloride, the excess liquor decanted, the impregnated chromite oven-dried, and then reduced for one hour with hydrogen, while the temperature was elevated to 800° F. A sweetened octane cut was passed over this catalyst at a temperature of approximately 900° F. and a space velocity of approximately 0.8 liquid/volume catalyst space/hour. The refractive index increased from 1.4194 to 1.4281 and the efflux gas contained approximately 85% hydrogen, the gas being evolved at a rate of approximately 4800 cc. per hour. The catalyst was substantially completely regenerated by the simple expedient of air blowing and reducing.

*Example II.*—Magnesium chromite prepared as above was immersed first in a saturated solution of nickel formate, followed by immersion in a 3.0% solution of platinum chloride. The impregnated chromite was dried at approximately 180° F., and reduced for one hour with hydrogen, while the temperature was elevated to 900° F. A sour petroleum octane stock consisting substantially of saturated hydrocarbons was passed over this catalyst at a temperature of approximately 900° F., at atmospheric pressure, and a space velocity of approximately 1.0 liquid/volume catalyst space/hour. The refractive index increased from 1.4194 to 1.4301 and the product contained approximately 8.0% by weight of olefins. The efflux gas contained approximately 85% hydrogen, the gas being evolved at a rate of approximately 4760 cc. per hour.

Although we have described our invention in relation to certain specific embodiments thereof, we do not intend to be limited thereby except insofar as is set forth in the appended claims.

We claim:

1. As a hydrocarbon conversion catalyst, platinum supported on magnesium chromite.

2. As a hydrocarbon conversion catalyst, nickel and platinum supported on magnesium chromite.

LLEWELLYN HEARD.
ALEX G. OBLAD.